United States Patent [19]

Mendenhall

[11] Patent Number: 4,558,561
[45] Date of Patent: Dec. 17, 1985

[54] MECHANICAL FRUIT PICKER

[76] Inventor: Harold P. Mendenhall, Star Rte. 1, Box 30, Lehi, Utah 84043

[21] Appl. No.: 526,527

[22] Filed: Aug. 26, 1983

[51] Int. Cl.$^4$ ............................................. A01D 46/24
[52] U.S. Cl. ................................. 56/328 R; 56/327 R
[58] Field of Search ...................... 56/328 R, 332, 334, 56/336, 340, 327 R, 16.5

[56] References Cited

U.S. PATENT DOCUMENTS

| | | | |
|---|---|---|---|
| 1,114,318 | 10/1914 | Vasey | 56/334 |
| 1,626,402 | 4/1927 | Fryman | 56/334 |
| 2,680,338 | 6/1954 | Space | 56/16.5 |
| 3,413,787 | 12/1968 | Van Antwerp et al. | 56/328 R |
| 3,460,330 | 8/1969 | Black, Jr. | 56/328 R |
| 3,559,387 | 2/1971 | Myers | 56/334 |
| 3,664,104 | 5/1972 | Jamshidi | 56/332 |
| 4,059,941 | 11/1977 | Taylor | 56/16.6 |

Primary Examiner—Gene Mancene
Assistant Examiner—David I. Tarnoff
Attorney, Agent, or Firm—Don E. Ferrell

[57] ABSTRACT

A mechanical fruit picker includes a vacuum-operated picking tube which is operably mounted to a tractor and which is designed to pick and deliver fruit to a trailer pulled behind the tractor. The vacuum in the tube is created by a blower mounted to the power take-off of the tractor, while foam rubber paddles are provided within the tube to slow the movement and thus prevent bruising of the fruit. An operator using the tube stands on a platform which is hydraulically adjustable in both horizontal and vertical directions and which is mounted on the top of the tractor. The tube is selectively retractible and extensible at both ends so as to facilitate the picking of fruit in difficult to reach locations and to control the distance that the fruit must fall into the fruit storage trailer. The trailer must be lined with foam rubber to further lessen the likelihood of the fruit damage during the picking operation.

1 Claim, 6 Drawing Figures

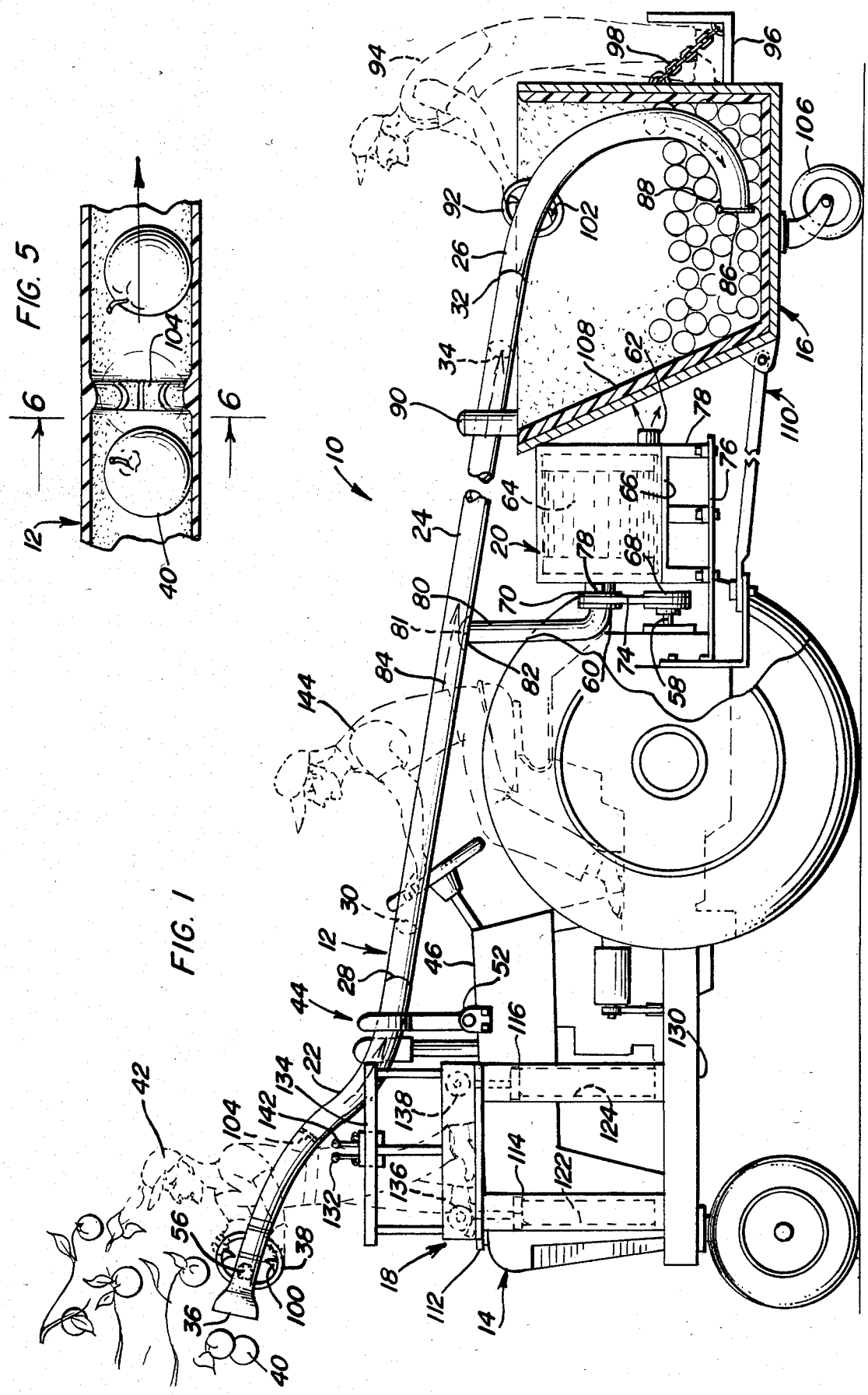

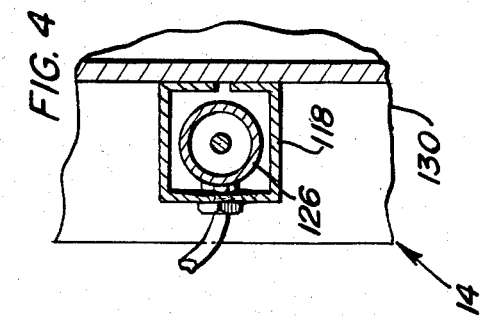
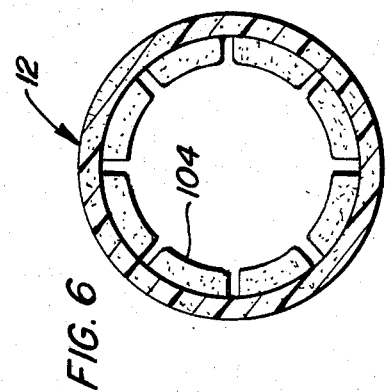
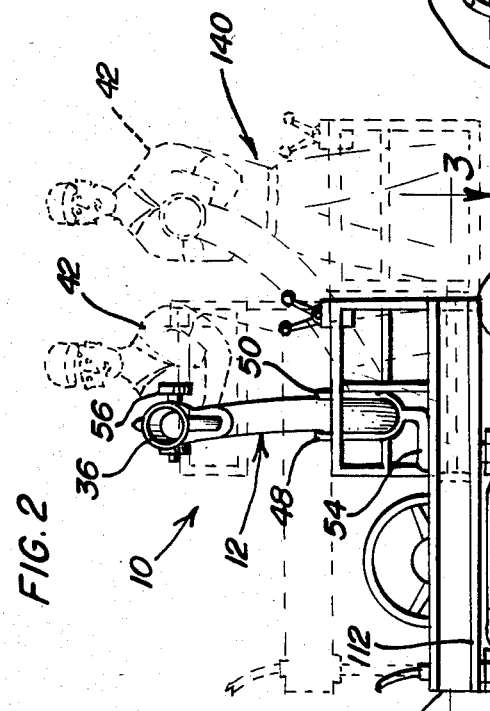
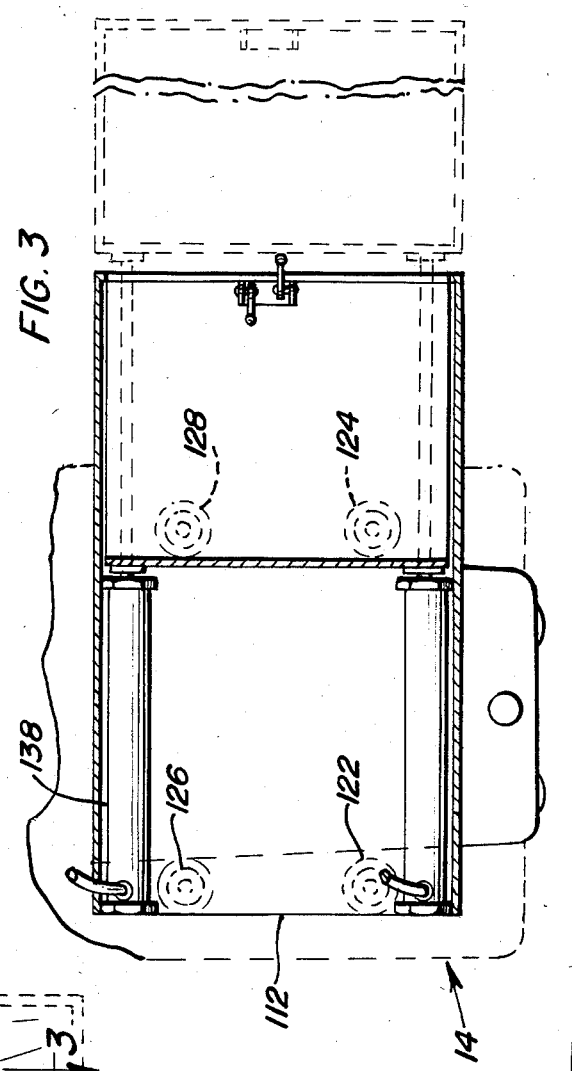
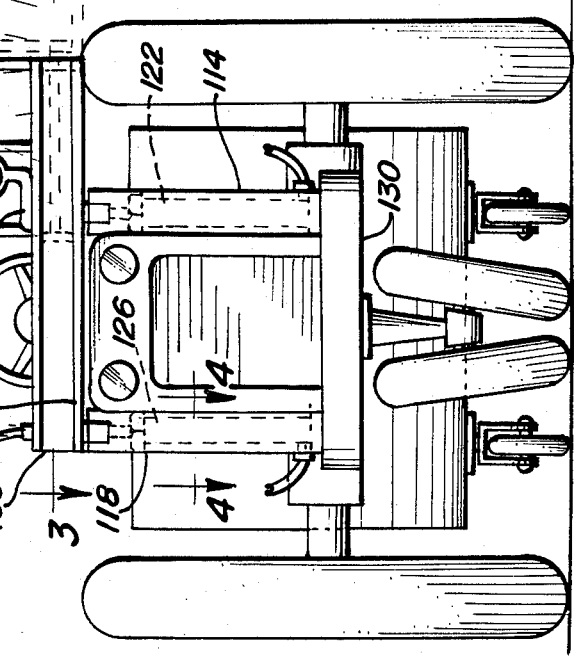

MECHANICAL FRUIT PICKER

BACKGROUND OF THE INVENTION

1. Field of the Invention

The present invention relates to fruit picking devices and more particularly pertains to a new and improved mechanical fruit picker which is designed to pick fruit through the use of a vacuum-operated suction tube in a manner which increases the rate of fruit picking while preventing damage thereto.

2. Description of the Prior Art

There has been a substantial number of different methods and apparatuses developed which are designed to reduce the complexity while speeding the process of picking fruit from trees. Some of the earliest and most well known fruit picking methods have involved the use of ladders to assist the pickers in reaching otherwise inaccessible fruit. The use of ladders and other climbing structures is, of course, cumbersome and slow, inasmuch as the ladders must be continually moved and in many cases, they cannot even be positioned, at least in a safe manner, in a location which permits the reaching of all of the available fruit on a particular tree. Many injuries continue to occur which are the result of ladders falling or from the pickers falling off of the ladders per se.

Resort has also been made to the development of a number of picking devices which effectively and substantially extend the reach of a picker to otherwise inaccessible places. A typical known device includes a double pronged grasping hook mounted on the end of a long pole whereby a picker can position the prongs about the sought-after fruit and disengage the same from a tree limb. However, these types of devices cannot be efficiently used in large commercial operations, inasmuch as the fruit is often bruised or otherwise severely damaged as a result of its dropping to the ground, while after being pulled down, the fruit must still be retrieved from the ground and packed into transporting containers. Accordingly, at least with respect to large scale commercial activities, there has been and continues to be a substantial effort to improve upon the prior art methods of picking fruit as above-described.

More recently, there has been some interest in utilizing suction tube devices to assist in the picking of fruit. For example, U.S. Pat. No. 3,473,312, which issued to Holt on Oct. 21, 1969, discloses a fruit picker which is effectively a tube-like member having a suction flow of air being drawn therethrough. The air intake end of the tube may be positioned proximate a piece of fruit, and the fruit will be effectively sucked into the tube and separated from its supporting tree limb. The fruit is then directed with the flow of air through the tube and is ejected out of the opposed end of the tube into a transporting container.

While recognizing the feasibility of using a suction tube for the purpose of picking fruit, the Holt apparatus would not be particularly feasible in large scale commercial operations due to the fact that the tube is designed to be carried and utilized by a single individual. Where large and tall fruit trees are involved, the length of the suction tube required would become prohibitive whereby a single individual could not efficiently utilize the same, while the design of the tube is such as to present the distinct possibility of fruit damage during picking. While damaged fruit is permissible for private home use, it normally cannot be profitably marketed by a commercial supplier.

The use of larger and more practical suction tube fruit pickers has also been discussed in patents. For example, U.S. published application No. B 380,900, which issued to Cardinal, Jr. on Jan. 28, 1975, discloses a flexible pick-up conduit that is connected to a source of vacuum for the purpose of picking up fruit, leaves and the like. The conduit is mounted to an assembly which includes at least three longitudinally expansible accordian-like tubular control members, and pressurized air flows through the control members in response to regulation by an air flow proportioning valve. The conduit discharges into a transporting container which is disclosed as being mounted on the bed of a truck. While apparently operating to function in the manner desired, it is noted that the conduit discharge is located at the top of the transporting container whereby a substantial drop is experienced by the ejected fruit. As such, substantial bruising and other damage to the fruit may occur, thus destroying its value in the market place.

A more ambitious and complex undertaking is to be found in U.S. Pat. No. 3,460,330, which issued to Black, Jr. on Aug. 12, 1969, wherein there is disclosed a tractor-like device having a plurality of suction tubes extending outwardly therefrom. The plurality of tubes extend in a multitude of radially-opposed directions so that a multiple fruit-picking operation can be performed, while all of the tubes discharge onto a conveyor belt with the discharged fruit then being dropped from the conveyor belt into a portable storage container. The apparatus disclosed in this patent is substantially complex in its design and most likely would be very expensive to manufacture. Further, as with the priorly discussed devices, no provision is made for carefully moving the picked fruit through the individual suction tubes and into the storage container in a manner which prevents fruit damage.

Of further interest with respect to the prior art is U.S. Pat. No. 3,413,787, which issued to Van Antwerp et al on Dec. 3, 1968, wherein there is disclosed a mechanical fruit picker that includes the use of a flexible suction tube mounted to a trailer pulled by a tractor. In this respect, the flexible tube is operably mounted to a boom structure having an operator basket mounted on its free end, whereby an operator may stand in the basket and maneuver the flexible tube into various desired fruit picking positions. The boom is hydraulically controlled with respect to its positioning, while the discharge of the flexible conduit is directed into a wheeled wagon attached to the back of the tractor.

The Van Antwerp fruit picker is of an expensive and complex construction, and additionally, no provision is made for carefully and delicately moving the picked fruit through the suction conduit or for carefully depositing the fruit in the storage wagon, thereby to prevent fruit damage.

As is apparent with respect to the above discussion of the prior art, a satisfactory solution for utilizing suction conduits in an economical and efficient manner for picking fruit, while at the same time preventing fruit damage, is not yet available in the public domain. It stands to reason, therefore, that there exists a substantial need for such solutions, and in this regard, the present invention substantially fulfills this need.

SUMMARY OF THE INVENTION

The general purpose of the present invention, which will be described subsequently in greater detail, is to provide a new and improved mechanical fruit picker assembly which has all of the advantages of the prior art mechanical fruit picker assemblies and none of the disadvantages. To attain this, the present invention envisions the use of a flexible suction tube movably mounted between a tractor and a fruit collection trailer mounted to the tractor. A blower is operably attached to the tractor's engine power take-off and a vacuum hose is mounted between the blower intake and the flexible suction tube. The vacuum hose creates the desired suction in the flexible suction tube without impeding the flow of fruit therethrough.

The suction end of the suction tube is provided with handles whereby an operator may direct the conduit into a plurality of desired positions for picking the fruit, while a hydraulically-adjustable work platform on which the operator may stand is mounted on the top of the tractor. The work platform may be moved both horizontally and vertically to assist an operator in reaching the fruit with the suction tube, thereby to lessen the need for a long suction tube or the frequent moving of the supporting tractor.

The intake end of the suction tube may be provided with an operator-controlled valve to regulate the amount of suction, while the other end of the tube may be provided with handles to assist an additional operator in maneuvering the tube within the transporting trailer. In this respect, the transporting wagon is lined with foam rubber or some other soft material, while the depositing end of the suction tube is positionable downwardly within the trailer. The depositing end of the tube may include a telescoping construction whereby its length may be varied by the operator to thus control the distance that the deposited fruit must drop before impact. Similarly, the suction end of the tube may also be of a telescoing construction to improve the maneuverability of the tube during its use by an operator on the work platform. A further work platform may be provided on the back of the storage trailer so as to provide a work station for the operator controlling the depositing end of the tube.

To further assist in the deposition of fruit into the storage trailer without bruising or otherwise damaging the same, foam rubber paddles are positioned at intermittent locations within the interior of the suction tube. These paddles are flexible to the extent that they will bend without damage along with a concurrent bending of the flexible suction tube and will also yieldably bend to allow fruit to pass thereby. In effect, these paddles serve to slow the passage of fruit through the suction tube to the extent that no bruising damage will occur to the fruit being deposited within the storage trailer.

It is therefore an object of the present invention to provide a new and improved mechanical fruit picker assembly which has all of the advantages of the prior art mechanical fruit picker assemblies and none of the disadvantages.

It is another object of the present invention to provide a new and improved mechanical fruit picker assembly which may be easily and efficiently manufactured and marketed.

It is a further object of the present invention to provide a new and improved mechanical fruit picker assembly which may be efficiently and reliably operated.

Even another object of the present invention is to provide a new and improved mechanical fruit picker assembly which is of a durable and rugged construction.

Still another object of the present invention is to provide a new and improved mechanical fruit picker assembly which accelerates the process of picking fruit from trees.

Yet another object of the present invention is to provide a new and improved mechanical fruit picker assembly which facilitates the picking of fruit while substantially reducing bruising and other fruit damage.

An even further object of the present invention is to provide a new and improved mechanical fruit picker assembly which is susceptible of a low cost of manufacture with regard to both materials and labor, and which accordingly is then susceptible of low prices of sale to the consuming public, thereby making such assembly economically available to the buying public.

Still yet another object of the present invention is to provide a new and improved mechanical fruit picker assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1 is a side elevation view illustrating the present invention operably installed on a tractor.

FIG. 2 is a front elevation view of the invention as it appears when installed on a tractor.

FIG. 3 is a cross sectional view of the invention taken along the line 3—3 in FIG. 2.

FIG. 4 is a cross sectional view of the invention taken along the line 4—4 in FIG. 2.

FIG. 5 is a cross sectional detail view illustrating the manner of fruit movement through the suction tube forming a part of the present invention.

FIG. 6 is a detailed cross sectional view illustrating the construction of the foam paddles forming a part of the present invention.

DESCRIPTION OF THE PREFERRED EMBODIMENTS

With reference now to the drawings and in particular to FIG. 1 thereof, a new and improved mechanical fruit picker embodying the principles and concepts of the present invention and generally designated by the reference numeral 10 will by described. In this respect, it can be seen that the mechanical fruit picker 10 includes a suction tube 12 mounted to and extending between a transporting vehicle, such as a tractor 14, and a movable storage container, such as a trailer or wagon 16 which is attached to the tractor. The fruit picker 10 further includes a hydraulically-adjustable work platform 18 mounted over the engine of the tractor 14, and a blower assembly 20 which operates to create a flow of suction air through the tube 12.

With continuing reference to FIG. 1 of the drawings, it can be seen that the suction tube 12 is of an elongated flexible construction and, if desired, may be constructed in a plurality of sections 22, 24, 26 which are joined together in a telescoping manner. As shown, the tube section 24 has a first open end 28 into which an end 30 of tube section 22 is slidably positionable. By the same token, the second open end 32 of tube section 24 slidably receives an end 34 of tube section 26. In effect then, tube section 22 is longitudinally slidable within the tube section 24, while tube section 26 is similarly longitudinally slidable within the section 24.

With further reference to this telescoping construction as defined by the tube sections 22, 24, 26, it is to be realized that a substantially close and conforming fit must be achieved between these sections to prevent substantial air leakage which would otherwise interfere with the flowthrough of air in the tube 12 which is utilized for picking fruit in a manner yet to be described. Further, the telescoping construction defined by the multiple sections 22, 24, 26 is representative of various other means which might be employed to effect a retractible and extensible construction of the tube 12 and as such, it is not intended to limit the invention strictly to the construction shown and described. For example, it is within the purview of the instant invention to utilize a pleated or corrugated suction tube 12 which would dispense with the telescoping sections 22, 24, 26 and which would rely alternatively upon an accordian-like movement of one integral tube 12. This latter construction would also provide for an extensible and retractible movement of the tube 12, as would the providing of means for selectively removing or adding additional sections of tubing as needed.

Inasmuch as a suction is created in the tube 12 to pull fruit 40 from hanging tree limbs and the like, the tube is provided with an expanded nozzle end 36 to facilitate its positioning about the fruit during the picking operation. Once the fruit 40 is substantially positioned within the nozzle end 36, the suction effect of the tube 12 will operate to disengage the fruit from the limb while the nozzle end then operates to selectively guide the fruit into the tube per se. A handle arrangement 38 many be provided proximate the nozzle end 36 to facilitate the positioning of the tube 12 by a first operator 42.

A tube holder or support 44 is mountable to a topmost portion 46 of the tractor 14, such support serving to effectively attach the suction tube 12 to the tractor. Viewing FIG. 2 in conjunction with FIG. 1, it will be noted that the support 44 is of a bifurcated construction whereby the hose 12 is slidably retained between a pair of upstanding arms 48, 50. Further, the support 44 may be mounted on a swivel bearing 52 to allow it to rotate as needed, and may also include a bent arm portion 54 to increase the range of rotational movement. In this regard, some flexibility of movement of the support 44 is desirable so as to permit the suction tube 12 to move concurrently with any change in the position of the operator 42, as occasioned by the movement of the work platform 18 and as will be subsequently described.

Also shown in FIG. 1 is a manually operable valve 56 positioned in the suction tube 12 proximate the nozzle end 36, with such valve being operated by the operator 42 to control the amount of suction realized at the nozzle end. The valve 56 may be of a conventional construction and most likely would include internally located baffles which would reduce the diameter of the tube 12 at the nozzle end 36, thereby to facilitate the picking of fruit having substantially varying diameters, all of which are of a lesser diameter than the diameter of the tube 12 per se. As such, the valve 56 serves as an adjustment means which will permit an operator to pick different sizes of fruit 40 without the necessity of having to change the size of the suction tube 12 or its associated nozzle end 36.

The suction effect in the tube 12 is achieved through the use of the aforementioned blower 20 which is operably connected to the power take-off 58 of the tractor 14. The blower 20 includes an air suction end 60, an air discharge end 62, and a conventional rotating impeller 64 contained within the blower housing 66. As is well known in the art, as a result of the rotation of the impeller 64, an intake of air occurs at the suction end 60 of the blower 20 with such air then being discharged through the air discharge end 62.

To effect a rotation of the impeller 64, a first pulley 68 is mounted to the engine power take-off 58, and a second pulley 70 is fixedly secured to the rotatable impeller support shaft 72. A drive belt 74 is then operably mounted between the pulleys 68, 70 and as is now apparent, a rotation of the power take-off 58 results in a concurrent rotation of the impeller 64 to effect the desired operation of the blower 20.

With further reference to FIG. 1, it will be noted that the blower 20 may be mounted to a platform 76 fixedly secured to the tractor 14, with such mounting of the blower thereto being by any conventional means, such as by bolting one or more support legs 78 directly to the platform. With the blower 20 secured in position on the platform 76, a suction hose 80 may be interconnected between the suction end 60 of the blower and a provided opening 82 in the suction tube 12. In this regard, a sealed connection between the hose 80 and the opening 82 is desired to prevent air leakage and such connection can be achieved by any known and conventional means, such as by gluing, stitching, or the like. A perforated cover plate 81, such as a screen or the like, may be fixedly secured over the opening 82 whereby the fruit 40 would be prevented from lodging in or dropping into the opening, while air flow through the opening would be unimpeded.

When operating then, the blower 20 will draw air downwardly through the tube 12 in the direction of the arrows 84 inasmuch as it is envisioned to utilize a one-way valve 86 on the discharge end 88 of the suction tube 12. The one-way valve 86 will move outwardly to permit the fruit 40 to be discharged into the wagon 16 and at other times will effectively close off the discharge end 88 of the suction tube 12, thereby to prevent a reverse air flow upwardly through the tube and into the intake hose 80 of the blower 20. As such, all of the suction effect achieved by the blower 20 is experienced at the nozzle end 36 of the suction tube 12, thus to improve the efficiency of the fruit picking.

Also illustrated in FIG. 1 with respect to the construction of the suction tube 12 is a further hose holder or support 90 which may be operably mounted to the wagon 16 by some conventional means. The hose holder 90 is also of a bifurcated construction to permit any desirable slidable movement of the suction tube 12, as required, and if desired, the holder could be mounted on a swivel bearing similar to the construction of the support or holder 44 mounted on the topmost portion 46 of the tractor 14. A further handle arrangement 92 is secured to the section 26 of the suction tube 12, such handle arrangement constituting an optional design feature whereby a further operator 94 could utilize the handle arrangement to maneuver the suction tube as desired. In this respect, the wagon 16 may also be provided with a further work platform 96 which may be operably mounted to the back of the wagon, whereby the operator 94 may stand on the platform while maneuvering the suction tube 12. The work platform 96 may be of any conventional construction and may, if desired, include a chain support means 98 and a pivotal hinge arrangement, whereby the platform could be collapsed into a folding position when not being utilized.

It should be noted that both of the handle arrangements 38, 92 are depicted as having respective trigger mechanisms 100, 102 disposed in a position whereby the respective operators 42, 94 could operate the triggers as desired. These triggers 100, 102 could electrically operate small pulley, cable and servomotor mechanisms which would effect the desired retraction or expansion of the respective sections 22, 26 of the tube 12. Further, they could be utilized to operate any other conceivable positioning controls or to control the amount of air and fruit flow thrugh the suction tube 12.

A further novel feature relating directly to the construction of the suction tube 12 in the present invention is illustrated in FIGS. 1, 5 and 6. In this regard, foam rubber paddles 104 may be intermittently positioned throughout the internal longitudinal length of the suction tube 12 with such paddles operating to slow the movement of fruit 40 through the tube. More specifically, the foam rubber paddles 104 are of a flexible construction and may be wider and thicker at a topmost portion thereof. The paddles 104 may be attached to the interior of the suction tube 12 by some conventional means, such as gluing or the like, and such paddles may be attached in position during a manufacturing process or subsequent thereto. Alternatively, the individual paddles 104 could be fixedly secured to a circular ring which in turn could then be affixed to the internal wall structure of the suction tube 12, whereby various sized ring and paddle arrangements could be manufactured to facilitate their use in various sized tubing. The paddles 104, which are described as being made of foam rubber, could be manufactured from any soft and flexible material and operate to substantially reduce the diameter of the suction tube 12 at various locations whereby the moving fruit 40 will strike the paddles during its movement through the tube 12. The paddles 104 will initially tend to stop the movement of the fruit 40, but will then flexibly bend and allow the fruit to continue to move, with such fruit then having been substantially slowed in its movement whereby bruising and other damage to the fruit will be lessened upon its deposition in the wagon 16.

Regarding the specific construction of the wagon 16, it can be seen that the same may be of any conventional design, with the preferred embodiment illustrated including the use of a single centrally positioned and pivotable "crazy" wheel 106. By the use of a single wheel 106, the wagon 16 can be easily maneuvered manually or by the tractor 14 to various desired positions so as to facilitate a fruit picking operation. To further lessen the liklihood of damaging the fruit 40, it is envisioned that a layer of foam rubber 108, or some similar soft material, could be utilized to completely line the interior portion of the wagon 16. This feature, combined with the fact that the tube 12 is maneuverable by the operator 94 so as to always have its discharge end 88 lying proximate to the existing layer of fruit 40, substantially lessens the liklihood of fruit damage which could lessen the marketability and utility thereof. Of course, the trailer or wagon 16 may be provided with any conventional hitch arrangement, such as hitch assembly 110, which would facilitate an operable attachment of the wagon to the tractor 14. Such hitch assemblies are well known in the art and constitute no part of the present invention.

Reference should next be had to FIGS. 1–4 for a discussion of the manner of construction and operation of the aforementioned work platform 18. In this respect, it can be seen that the work platform 18 includes a support deck 112 upon which an operator 42 may stand, with such deck being positioned over the topmost portion 46 of the tractor 14 through the use of four support stanchions 114, 116, 118, 120. The support stanchions 114, 116, 118, 120 may be mounted to a tractor 14 by any conventional means to include bolting, welding, or the like, and may be constructed of any conventional functional materials, such as angle or channel iron, hollow metal posts, etc.

In the preferred embodiment of the present invention, it is envisioned that the support stanchions 114, 116, 118, 120 will be formed from appropriately interconnected channel members, such as illustrated in FIG. 4, and will be of such a dimension as to permit the retention therein of a plurality of a hydraulically-actuated piston and cylinder arrangements hereinafter referred to as hydraulic actuators 122, 124, 126, 128 respectively positioned within the support stanchions 114, 116, 118, 120. As illustrated, the hydraulic actuators 122, 124, 126, 128 have their cylinder ends fixedly secured to a frame portion 130 of the tractor 14 and have their opposed piston ends fixedly secured to the aforementioned support deck 12. Further, the hydraulic actuators 122, 124, 126, 128 are supported within the respective interiors of the support stanchions 114, 116, 118, 120 and are vertically aligned whereby upon an extension of their piston members in a conventional manner, the support deck 112 will be moved upwardly in a direction above the topmost portion 46 of the tractor 14.

In effect then, the hydraulic actuators 122, 124, 126, 128 operate as a means for raising and lowering the support deck 112, with such raising and lowering being accomplished by the operator 42 through the use of a pivotally actuatable control lever 132 mounted on a guard rail 134 which encircles the support deck 112. The control lever 132 is of a conventional construction well known in the art whereby an extension of the hydraulic actuators 122, 124, 126, 128 can be achieved by pivotally moving the lever in a first direction and a retraction of the actuators can be achieved by pivoting the lever in an opposing direction. The lever 132 will seek a central position which results in no retraction or expansion of the hydraulic actuators 122, 124, 126, 128.

Additionally, it should be noted that hydraulic actuators 122, 124, 126, 128 are commercially available and are commonly used in conjunction with harvesting equipment. Accordingly, the hydraulic control circuit associated with the use of the hydraulic actuators 122, 124, 126, 128 forms no part of the present invention and will not be described. Such control circuits are commerically available and may be easily installed on a tractor 14, whereby the engine of the tractor serves as the power source to effect the operation of the actuators 122, 124, 126, 128.

Inasmuch as the support deck 112 is capable of vertical movement designed to aid an operator 42 in picking fruit 40 located at various heights on trees, a further pair of hydraulic actuators 136, 138 may be employed for the purpose of providing selective horizontal movement of the support deck. More particularly, the support deck 112 may be constructed as a double plate arrangement or alternatively, it may be slidably positioned in angle members or some other similar type of supporting structure. Either the piston or cylinder end of the hydraulic actuators 136, 138 may be fixedly secured to the tractor 14 or the afore-described support stanchions 114, 116, 118, 120 by some conventional means, with the remaining ends of the actuators then being fixedly secured to the support deck 112. In this regard, the precise manner of attachment of the hydraulic actuators 136, 138 is a matter of design choice and as such, all manners of attaching the actuators to the tractor 14 and its supporting structure are within the purview and intent of the present invention.

With the hydraulic actuators 136, 138 then being operably attached to the support deck 112, an extension of the hydraulic actuators in a conventional manner will result in the deck moving in a horizontal direction, such as into the position indicated by phantom lines in FIG. 2 and generally designated by the reference numeral 140. A subsequent retraction of the actuators 136, 138 will move the deck 112 and the operator 42 back over the topmost portion 46 of the tractor 14. Accordingly, through the use of the hydraulic actuators 136, 138, horizontal movement of the operator 42 is selectively provided to further facilitate a fruit picking operation. A further manually operable pivotal control lever 142 may be attached to the guardrail 134, with such further control lever being operable in the manner of the afore-described control lever 132 and serving to control the retraction and expansion of the hydraulic actuators 136, 138 in a well known and conventional manner.

With respect to the manner of operation of the mechanical fruit picker 10 which forms the present invention, it can be appreciated that the same could be manufactured and sold as a compact package for attachment to a conventional tractor 14, or some similar harvesting or transporting vehicle. Such a compact package could include, but not necessarily be limited to, the suction tube assembly 12, a transporting trailer or wagon 16, a hydraulically-adjustable work platform 18 and a blower assembly 20. The entire fruit picker arrangement 10 could be operably mounted to a tractor 14 in a reasonably short period of time and when not in use, the essential components of the invention could be disconnected and conveniently stored until a further required use. As such, the overall utility of a tractor 14 is not impaired, inasmuch as the mechanical fruit picker 10 may be removed therefrom when desired so that the tractor can be utilized for other farm or harvesting duties.

With the mechanical fruit picker 10 operably attached to a tractor 14, a further operator 144 need only to drive the tractor to a location proximate a tree having fruit 40 located thereon, whereby an operator 42 may stand upon the work platform 18 in a fruit picking position. With the engine of the tractor 14 running, the blower 20 will draw a flow of air 84 through the nozzle end 36 of the suction tube 12. The operator 42 may then position the nozzle end 36 over a piece of fruit 40 with the resulting suction in the tube 12 then effectively separating the fruit from the tree limb. The size of the orifice and suction in the nozzle end 36 may be controlled through a manual operation of the valve 56, while the operator 42 may maneuver the nozzle end into the desired picking position through the use of a handle arrangement 38.

Once the fruit 40 has entered the suction tube 12, it will move therethrough with the flow of air 84 and will occasionally come into contact with intermittently positioned foam paddles 104. These paddles 104 flexibly bend to permit the fruit 40 to continue its movement in the suction tube 12, while at the same time, they operate to slow the rate of movement of the fruit, thereby to control its delivery speed into the wagon 16. The downward slope of the suction tube 12 will facilitate the continued movement of the fruit 40 towards the trailer 16 after the fruit has passed by the air intake hose 80, such air intake hose effectively causing the air movement within the tube. After dropping downwardly through the tube section 26, the fruit 40 will come into contact with the flapper valve 86 and the weight of the fruit will cause the valve to temporarily open, thereby permitting the fruit to be deposited within the wagon 16.

To facilitate the reaching of fruit 40 at various locations on a tree without the necessity of continually moving the tractor 14, the operator 42 may be provided with controls 100 or some similar means of effecting a desired extension and retraction of the suction tube 12. This can be accomplished by the slidable movement of section 22 of hose 12 within section 24 thereof. Similarly, a slidable movement of section 26 within section 24 is afforded to a further operator 94 whereby an end 88 of the tube can always be selectively positioned proximate the collected fruit within the trailer 16, thereby to substantially reduce the liklihood of fruit damage as might be otherwise occasioned if the fruit was dropped into the trailer from a topmost rim portion thereof.

As a further means of permitting the reaching of fruit 40 in various locations upon a tree without the necessity of moving the tractor 14, the operator 42 is provided with a pair of controls 132, 142 which may be manually actuated to adjust the vertical and horizontal position of the support deck 112 on which he stands. More specifically, control 132 may be operated to raise or lower the support deck 112 through the extension or contraction of a plurality of hydraulic actuators 122, 124, 126, 128 which are fixedly secured to the support deck. By the same token, a horizontal slidable movement of the deck 112 may be accomplished through a manipulation of the control lever 142, whereby a pair of hydraulic actuators 136, 138 may be selectively retracted or expanded to effect such horizontal movement. Accordingly, an operator 42 is afforded a great latitude in position to obtain fruit 40 from locations which might otherwise be difficult or virtually impossible to reach.

While the invention has been shown in FIG. 1 as being operated by three operators 42, 94, 144, it is to be understood that the invention could be quite acceptably operated by a single individual inasmuch as the tractor 14 could be parked in position and the single individual could then operate the entire fruit picker arrangement 10 from the work support deck 112. Further, it is to be understood that many variations in design of the mechanical fruit picker 10 are within the purview and scope of the invention, to include the use of more or fewer hydraulic actuators, additional support structure, alternative blower arrangements, etc.

With respect to the above description then, it should be realized that the optimum dimensional relationships for the parts of the invention, to include variations in size, material, shape, form, function and manner of operation, assembly and use, are deemed readily apparent and obvious to one skilled in the art, and all equivalent relationships illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mechanical fruit picker assembly for attachment to and use with a powered transporting vehicle, said assembly comprising:

suction tubes means operably attachable to said vehicle, said suction tube means including an expanded nozzle portion for positioning over fruit to be picked and further including at least one foam paddle arrangement fixedly secured therein, said foam paddle arrangement being of a flexible construction whereby movement of said fruit through said suction tube means is interfered with, thereby to effect a slowing of movement of such fruit to thus prevent fruit damage, said suction tube means further having an end portion positioned within a trailer means attached to said vehicle, said end portion being selectively positionable whereby a rate and distance of fruit movement is minimized, thereby to reduce fruit damage, said trailer means being lined with a padding means to further reduce fruit damage, said suction tube means being selectively extensible and contractable to control a positioning of said nozzle portion;

adjustable nozzle means attached to a fruit receiving end of said suction tube means, said adjustable nozzle means including an expanded diameter portion defining said expanded nozzle portion to facilitate a positioning of said suction tube means over said fruit, said adjustable nozzle means further including an adjustable valve means for controlling an amount of suction within said suction tube means;

further valve means on a fruit depositing end of said suction tube means, said further valve means being moveable in one direction to permit said fruit to be deposited in said trailer means and at other times being in a normally closed position whereby reverse air flow through said suction tube means is prevented;

suction tube support means including at least one bifurcated support swively mounted on a topmost portion of said vehicle, said suction tube means being slidably positioned between spaced-apart arms defining said bifurcated support, said support further including an angulated transversely-extending arm portion which substantially increases its arc of rotation, thereby to increase an extent of operable movement of said suction tube means;

first work station means operably positionable on said vehicle, whereby an operator may be located on said first work station means during a fruit picking operation, said first work station means being vertically adjustable by a first hydraulic actuator means and being horizontally adjustable by a second hydraulic actuator means, such vertical and horizontal adjustment being effected by said operator through a manual operation of control means positionable on said first work station means;

second work station means operably attached to said trailer means, said second work station means permitting a second operator to stand thereon while controlling the positioning of said fruit depositing end of said suction tube means; and power supply means for operably effecting a suction flow of air within said suction tube means, whereby said suction flow of air may be utilized to separate said fruit from said tree and effect flowthrough of said fruit through said suction tube means, said power supply means including a blower means operably interconnected between a power take-off of said vehicle and said suction tube means, said blower means including a conduit means attached between an intake portion of said blower means and an intermediate portion of said suction tube means, thereby to establish fluid communication therebetween and to effect said suction flow of air within said suction tube means.

* * * * *